(12) United States Patent
Okochi

(10) Patent No.: US 8,184,908 B2
(45) Date of Patent: May 22, 2012

(54) IMAGE PROCESSING SYSTEM, IMAGE PROCESSING METHOD, AND PROGRAM

(75) Inventor: Takayoshi Okochi, Yamato-Koriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1052 days.

(21) Appl. No.: 12/060,720

(22) Filed: Apr. 1, 2008

(65) Prior Publication Data

US 2008/0298686 A1 Dec. 4, 2008

(30) Foreign Application Priority Data

Apr. 6, 2007 (JP) ................................. 2007-100410

(51) Int. Cl.
 *G06K 9/18* (2006.01)
(52) U.S. Cl. ........................................................ 382/182
(58) Field of Classification Search .................. None
See application file for complete search history.

(56) References Cited

U.S. PATENT DOCUMENTS 5,717,941 A 2/1998 Yoshida et al.

FOREIGN PATENT DOCUMENTS

| JP | 7-306927 A | 11/1995 |
|----|------------|---------|
| JP | 8-289102 A | 11/1996 |
| JP | 2002-288169 A | 10/2002 |
| JP | 2006-261821 A | 9/2006 |
| JP | 2006-339770 A | 12/2006 |
| JP | 2007-206939 A | 8/2007 |

*Primary Examiner* — Brian P Werner
*Assistant Examiner* — Elisa Rice
(74) *Attorney, Agent, or Firm* — Birch, Stewart, Kolasch & Birch, LLP

(57) ABSTRACT

An image processing system includes a computer and an image processing apparatus. A control portion of the apparatus controls so that a whole of one side and the other side of a transparent sheet are optically read, and the obtained image data of the front and rear sides is transmitted to the computer. A control portion of the computer controls so that character information for each of data area corresponding to containing ranges of the respective document on the transparent sheet is obtained by a character recognition, with respect to each front and rear side image data received, and the recognized character information of the both sides is related each other for each of the data area, based on previously associated front and rear information showing a front-and-rear position relation between one side and the other side of the document, and stored in a data storing portion.

12 Claims, 7 Drawing Sheets

FIG. 3
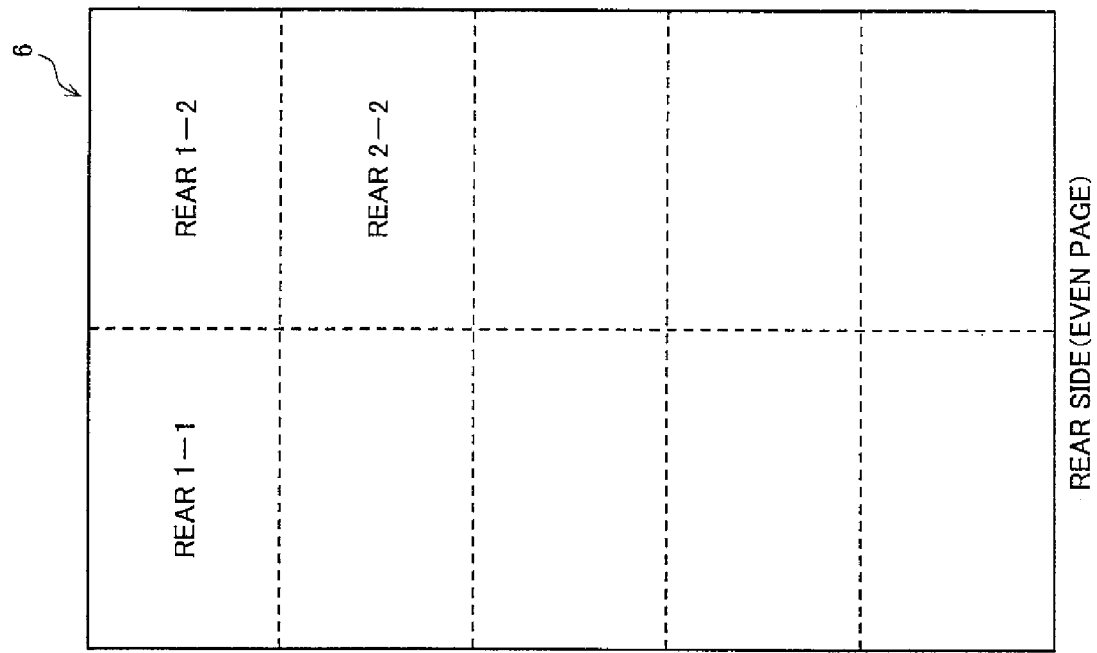
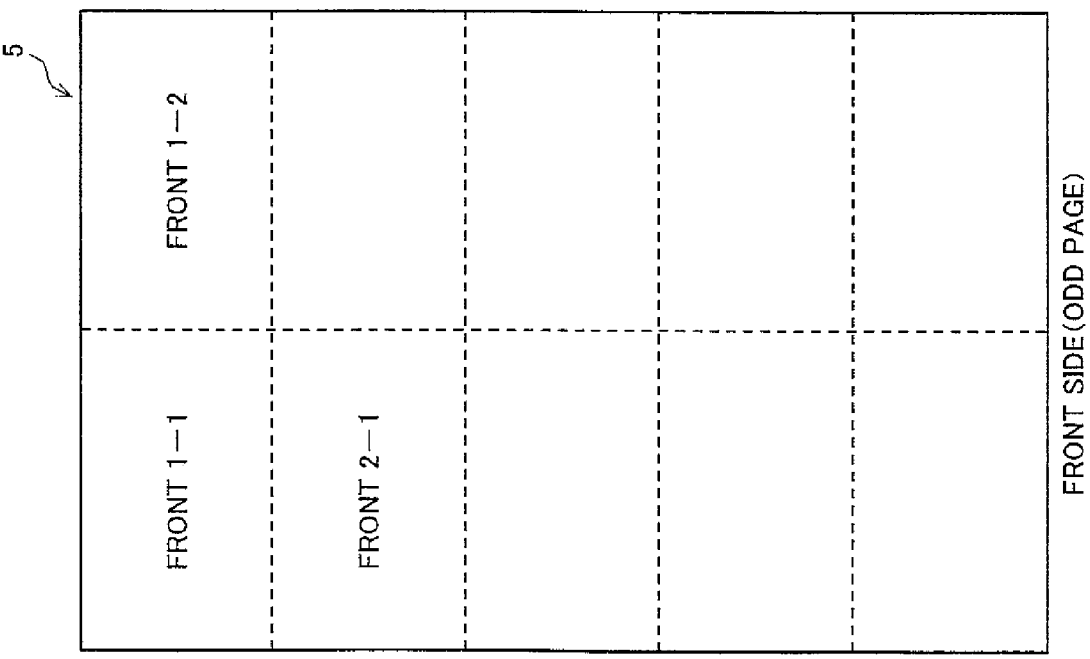

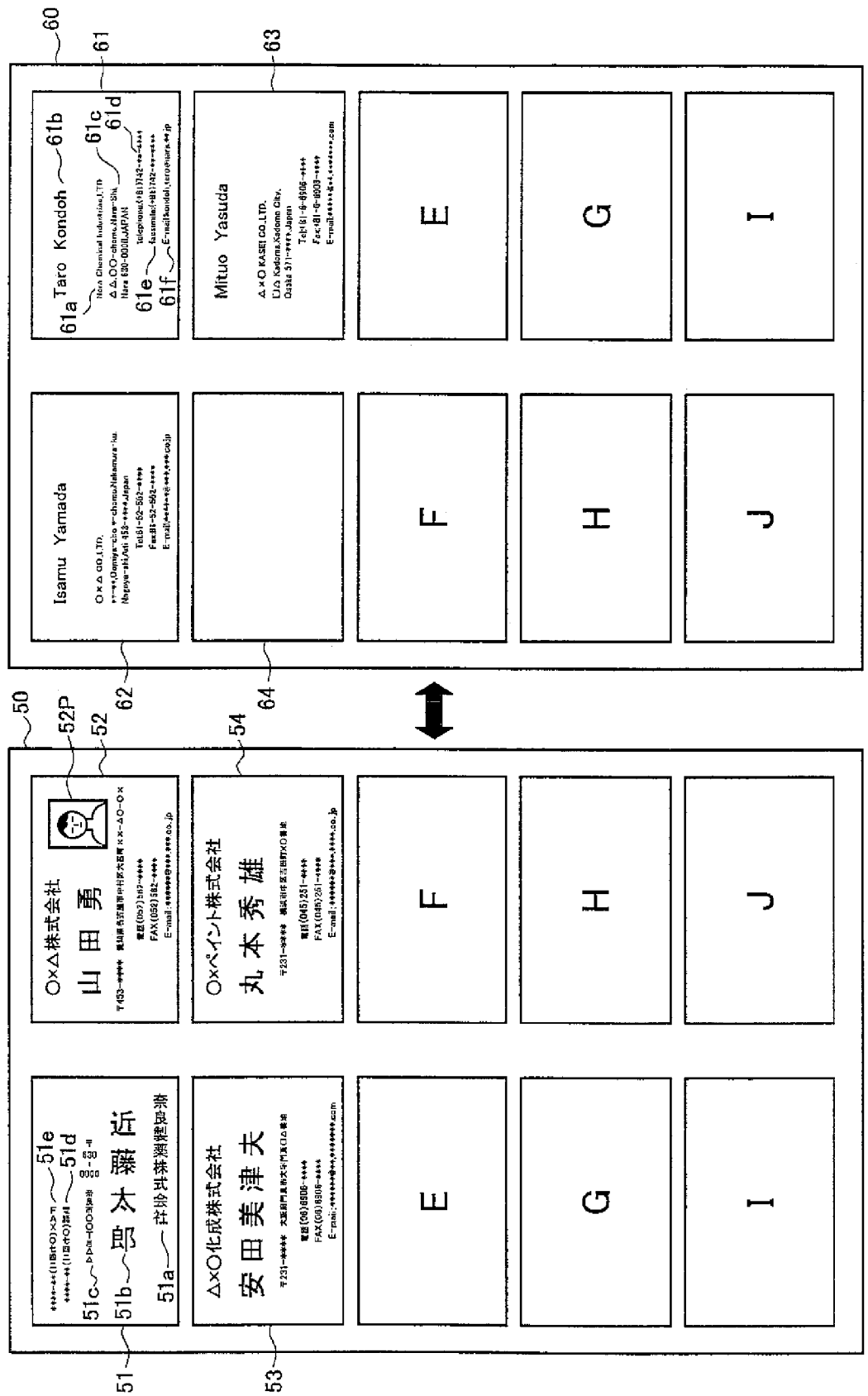

FIG. 5

| ID (70) | NAME (71) | NAME (READING KANA) (72) | COMPANY (73) | COMPANY (READING KANA) (74) | ADDRESS (75) | ADDRESS (READING KANA) (76) | TELEPHONE NUMBER (77) | FAX NUMBER (78) | MAIL ADDRESS (79) |
|---|---|---|---|---|---|---|---|---|---|
| 1 | 近藤太郎 | KONDOU TAROU | 奈良製薬株式会社 | NARA SEIYAKU | 奈良市○○丁目△△ | NARASHI○○CHOUME△△ | 0742--** | 0742--** | kondoh_taro@nara.**.jp |
| 2 | 山田勇 | YAMADA ISAMU | ○×△株式会社 | ○×△ | 愛知県名古屋市中村区大宮町××-△○…○× | AITIKEN NAGOYASHI NAKAMURAKU OOMIYACHOU ××-△○-○× | 052-562-** | 052-562- | @*.***.co.jp |
| 3 | 安田美津夫 | YASUDA MITUO | △×○化成株式会社 | △×○ | 大阪府門真市大字門真○○字門真□△番地 | OOSAKAHU KADOMASHI OOAZA KADOMA□△BANTI | 06-6906-** | 06-6906- | @.*****.com |
| 4 | 丸本秀雄 | MARUMOTO HIDEO | ○×ペイント株式会社 | ○× PEINTO | 横浜市中区吉田町×○番地 | YOKOHAMASHI NAKAKU YOSHIDACHOU ×○BANTI | 045-251-** | 045-251- | @*.*.co.jp |
| 5 | 岬良和 | MISAKI YOSHIKAZU | △△工業株式会社 | △△ KOUGYOU | 埼玉県鶴ヶ島市富士見△-○-○ | SAITAMAKEN TURUGASHIMASHI HUZIMI△-○-○ | 0492-79-** | 0492-79- | @.***.co.jp |

IMAGE PROCESSING SYSTEM, IMAGE PROCESSING METHOD, AND PROGRAM

CROSS-NOTING PARAGRAPH

This Non-provisional application claims priority under 35U.S.C. §119 (a) on Patent Application No. 2007-100410 filed in JAPAN on Apr. 6, 2007, the entire contents of which are hereby incorporated herein by reference.

FIELD OF THE INVENTION

The present invention relates to an image processing system, an image processing method, and a program, and, more particularly, to an image processing system, an image processing method, and a program, that read image information for a plurality of documents having front and rear sides such as a business card at a time to perform a character recognition.

BACKGROUND OF THE INVENTION

Conventionally, when a small-sized document such as a business card is optically read in a document reading apparatus, it has been difficult to perform an automatic document feeding because of a restriction to a mechanism of the apparatus, thus documents have been read by placing the documents one by one on a document platen.

In an image processing system described in Japanese Laid-Open Patent Publication No. 8-289102, image information of an entire case in which business cards of given size are inserted, is read to be converted into image data, and the image data is sent to a computer side via interface means. In the computer side, an image analysis is performed for every range area of the inserted business cards based on the sent and received image data, and the image data subject to the image analysis is managed for each business card. As the case, a transparent sheet is used.

However, in the system described in Japanese Laid-Open Patent Publication No. 8-289102, even when front and rear sides of a transparent sheet containing a plurality of documents such as a business card whose information on front and rear sides is stored as a pair, are read one side by one side (or both sides at a time) by a general scanner to be subject to OCR (Optical Character Reader) processing/database formation, the front and rear sides are treated as different data. Accordingly, in the plurality of documents from which image data is read at a time, a manual operation of recollecting data showing front and rear information as one data has been required.

SUMMARY OF THE INVENTION

The present invention is made in view of the foregoing circumstances, and an object is to provide an image processing system, an image processing method, and a program to be incorporated into the system, in which, with respect to a transparent sheet in which a plurality of documents whose information on front and rear sides is printed as a pair are contained, the information on the front and rear sides of the same document is stored in association with each other, without taking the labor.

In order to solve the above-mentioned problem, an image processing system according to the present invention includes a computer, and an image processing apparatus connected to the computer, wherein the image processing apparatus has a reading section that optically reads a transparent sheet capable of containing a plurality of documents of given size, to convert into image data; and a transmitting section that transmits the image data of front and rear sides consisting of one-side image data that has been obtained by optically reading a whole of one side by the reading section, and the other-side image data that has been obtained by optically reading a whole of the other side by the reading section, to the computer, and the computer has a receiving section that receives the image data of the front and rear sides transmitted from the image processing apparatus; a character recognizing section that obtains character information for each of data area corresponding to containing ranges of the respective documents on the transparent sheet by character recognition, with respect to each of the image data of the front and rear sides received by the receiving section; and a document information storing section that relates the character information of the front side recognized by the character recognizing section to that of the rear side for each of the data area, based on previously associated front and rear information showing a front-and-rear position relation between one side and the other side of the document, and stores them.

The image processing method according to the present invention is an image processing method that uses a computer and an image processing apparatus connected to the computers including: a reading step consisting of a step for optically reading a whole of one side to convert into one-side image data, and a step for optically reading a whole of the other side to convert into the other-side image data, with respect to a transparent sheet capable of containing a plurality of documents of given size by a reading section of the image processing apparatus; a transmitting step in which a transmitting section of the image processing apparatus transmits the image data of front and rear sides obtained in the reading step to the computer; a receiving step in which a receiving section of the computer receives the image data of the front and rear sides transmitted from the image processing apparatus in the transmitting step; a recognizing step in which a character recognizing section of the computer obtains character information for each of data area corresponding to containing ranges of the respective documents on the transparent sheet by character recognition, with respect to each of the image data of the front and rear sides received in the receiving step; and a storing step in which a document information storing section of the computer relates the character information of the front side recognized in the recognizing step to that of the rear side for each of the data area, based on previously associated front and rear information showing a position relation between one side and the other side of the document, and stores them.

The program according to the present invention is a program to be incorporated into a computer that is connectable to an image processing apparatus, wherein the program causes the computer to execute a receiving step in which image data of front and rear sides that is obtained by optically reading front and rear sides of a transparent sheet capable of containing a plurality of documents of given size in the image processing apparatus is received from the image processing apparatus; a character recognizing step in which, with respect to each of the received image data, character information for each of data area corresponding to containing ranges of the respective documents on the transparent sheet by character recognition is obtained; and a document information storing step in which the character information of the front side recognized in the recognizing step is related to that of the rear side for each of the data area, based on previously associated information of the front and rear sides showing a position relation between one side and the other side of the document, and stored.

BRIEF DESCRIPTION OF THE DRAWINGS

FIG. 3 is a schematic view for explaining front and rear information that is used in the image processing system in FIG. 1;

FIG. 4 is a diagram for showing an example of a pair of image data in which both sides of a transparent sheet are actually read in the image processing system in FIG. 1;

FIG. 5 is a diagram for showing an example of a data table generated from the pair of image data in FIG. 4;

PREFERRED EMBODIMENTS OF THE INVENTION

The image processing system according to the present invention is a system that includes the computer, and the image processing apparatus connected to the computer. The image processing apparatus is necessary to have at least a scanner function, and a communication function with a computer, and a multi-function peripheral which has more or less function, or a simple scanner apparatus (document reading apparatus) etc., is also applicable, in addition to a digital multi-function peripheral illustrated below. In addition, as for the computer, a general computer connectable to the image processing apparatus, into which a predetermined control program, which will be described later, is incorporated, may be used. The connection between the computer and the image processing apparatus is not limited to wired/wireless connections, and the image processing apparatus may be connected to a plurality of computers by a LAN etc., or simply by a USB cable etc.

Figure 1:
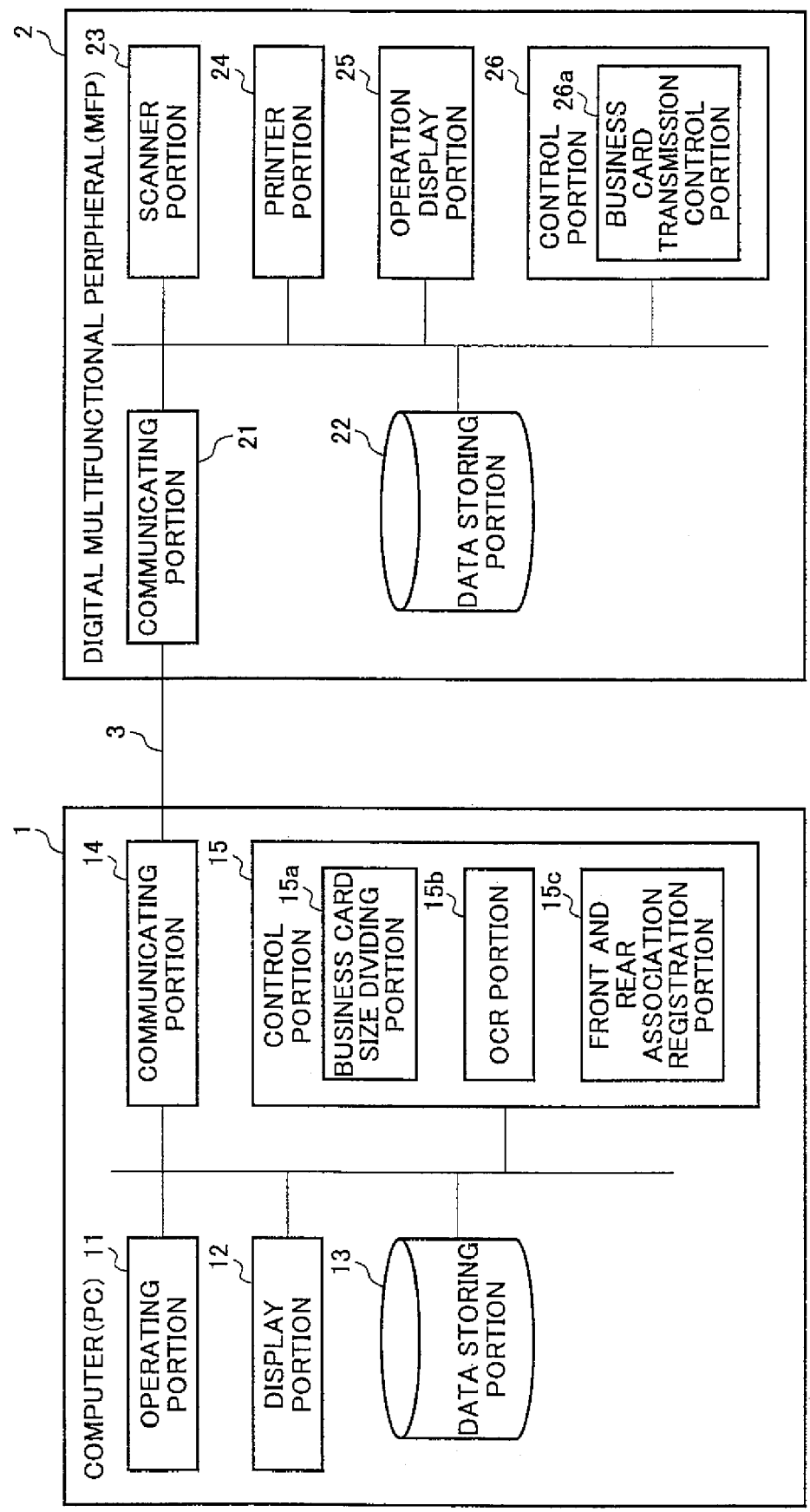
FIG. 1 is a block diagram for showing a structural example of an image processing system according to one embodiment of the present invention.
Figure 2:
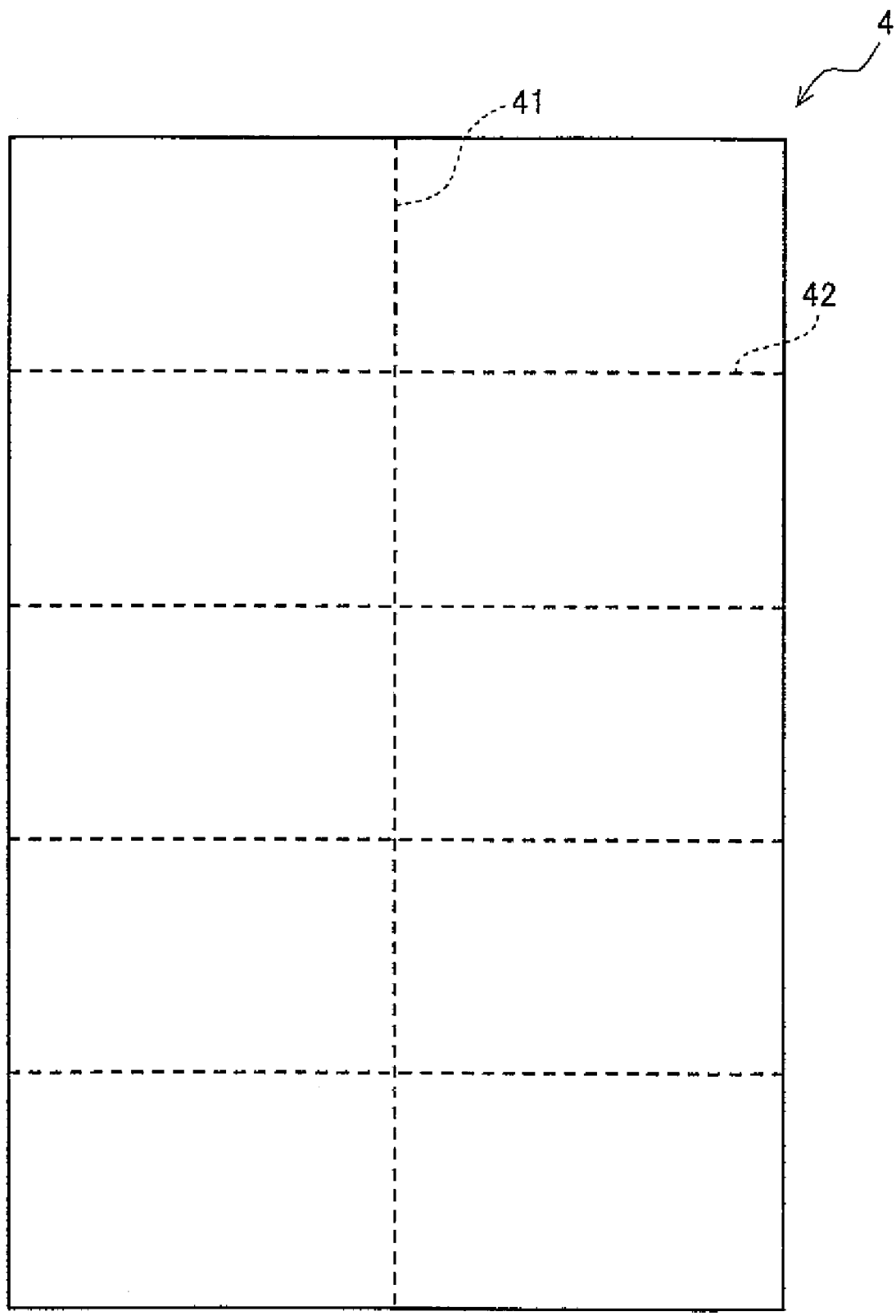
FIG. 2 is a diagram for showing an example of a transparent sheet to perform an image reading in the image processing system in FIG. 1.

FIG. 1 is a block diagram for showing a structural example of an image processing system according to one embodiment of the present invention, FIG. 2 is a diagram for showing an example of a transparent sheet to perform an image reading in the image processing system in FIG. 1, and FIG. 3 is a schematic view for explaining front and rear information that is used in the image processing system in FIG. 1.

In FIG. 1, 1 denotes a computer (hereinafter, illustrated as PC), 2 denotes a digital multi-function peripheral (hereinafter, referred to as MFP), and 3 denotes a network such as a LAN; in FIG. 2, 4 denotes a transparent sheet; and in FIG. 3, 5 denotes front-side (odd-page) image data and 6 denotes rear-side (even-page) image data.

The PC 1 illustrated in FIG. 1 is composed of an operating portion 11 such as a keyboard or a pointing device, a display portion 12 such as a liquid crystal panel, a data storing portion 13 such as a hard disc, a communicating portion 14 such as a LAN adapter that is connectable to the MFP 2 via the network 3, and a control portion 15 that controls these portions.

The control portion 15 has a business card size dividing portion 15a, an OCR portion 15b, and a front and rear associated registration portion 15c, which will be described later, and controls the whole PC 1 such as an image analysis of image data. For example, it is preferable that the control portion 15 includes hardware such as a CPU, a ROM as a program storage area, and a RAM as a work area, and that a predetermined control program is stored in the ROM or hard disc. Thereby, the predetermined control program stored in the ROM etc., is read onto the RAM and executed by the CPU, resulting that it is possible to realize a function of the control portion 15 including functions of the respective portions 15a to 15c.

On the other hand, the MFP 2 illustrated in FIG. 1 is composed of a communicating portion 21 such as a LAN adapter that is connectable to the PC1 via the network 3, a data storing portion 22 such as a hard disc, a scanner portion 23 that optically reads a document, a printer portion 24 that is capable of printing image data read by the scanner portion 23 and electronic files stored in the data storing portion 22, an operation display portion 25 such as a touch panel, and a control portion 26 that controls these portions.

The control portion 26 has a business card image transmission control portion 26a, which will be described later, and controls the whole MPF 2 such as a scan, a scan image data generation, a print data generation, and a print. For example, similar to the control portion 15, the control portion 26 also includes hardware such as a CPU, a ROM, and a RAM, and a predetermined control program is stored in the ROM, resulting that it is possible to realize a function of the control portion 26 including a function of the business card image transmission control portion 26a.

Next, based on the structural example as described above, a main characteristic part of the present invention will be described. First, a transparent sheet subject to a scan in the image processing system according to the present invention is a sheet capable of containing documents of given size in a state where the plurality of documents are arranged by being divided with vertical line(s) 41 and horizontal line(s) 42. As the transparent sheet, a commercially available transparent sheet for containing documents such as a business card in an easy-to-view layout in a state where the plurality of documents are arranged, can be used as it is, and it is unnecessary to prepare a special transparent sheet for realizing the present invention. Hereinafter, the exemplification for the transparent sheet will be made with an A4-sized transparent sheet 4 capable of containing double-sided business cards of 2×5 (capable of containing 10 business cards in total) as illustrated in FIG. 2, but documents other than a business card may be used, and a sheet having a color that the scanner portion 23 can read both sides of a plurality of documents may be used. Note that, a typical transparent sheet includes a sheet having a plurality of holes for filing as a booklet on horizontal or vertical sides, but there is no need to be provided with this type of sheet. In addition, processing of the present invention can be performed even when documents are actually not contained in part of a plurality of containing parts.

When a user places the transparent sheet 4 and performs an operation of reading a business card from the operation display portion 25, the MFP 2 optically reads a whole of one side of the sheet to convert into one-side image data, and optically reads a whole of the other side to convert into the other-side image data. The MFP 2 further transmits the image data of the front and rear sides (both sides) obtained by the conversion to the PC 1 via the network 3. The image data of the front and rear sides is defined as a set consisting of the front-side (or the rear-side) image data of the transparent sheet 4 and the rear-side (or the front-side) image data of the transparent sheet 4, that have been read sequentially.

The MFP 2 performs these processing by controlling the scanner portion 23 and the communicating portion 21 with the business card image transmission control portion 26a. Further, in the business card image transmission control portion 26a, there is no need to transmit as a set of the image data of the front and rear sides, and the control is performed so that one-side image data is transmitted by the communicating portion 21 when the one-side image data is obtained by a scan of the transparent sheet 4 in the scanner portion 23, and subsequently the other-side image data is transmitted by the communicating portion 21 when the other-side image data is obtained by the scan. The one-side image data and the other-side image data are transmitted by the MFP 2 so as to be identifiable from data names or headers, or combined by the PC 1 as a pair of subsequent image data.

In this way, the MFP 2 includes a reading section and a transmitting section that are illustrated in the business card image transmission control portion 26a and the scanner portion 23, and the business card image transmission control portion 26a and the communicating portion 21, respectively.

The PC 1 includes a receiving section that receives the image data of the front and rear sides transmitted from the MFP 2, as illustrated in the communicating portion 14. The PC 1 further includes a character recognizing section that obtains character information for each of data area corresponding to containing ranges (the above-mentioned ranges of given size) of the respective documents on a transparent sheet by the character recognition with respect to each image data for the front and rear sides received by the communicating portion 14.

In the character recognizing section, the business card size dividing portion 15a divides the respective received image data of the front and the rear sides into each data area corresponding to the containing ranges of the respective documents on the transparent sheet 4, and then the OCR portion 15b performs the character recognition for each data area. Further, alternatively, the character recognizing section may be configured so that the business card size dividing portion 15a divides the front-side image data into each data area and divides the rear-side image data into each data area, after the OCR portion 15b has performed the character recognition for the respective received image data of the front and rear sides. Furthermore, the division into each data area may be previously performed in the MFP 2 side.

The PC 1 further includes a document information storing section that relates the character information of the front side recognized by the character recognizing section to that of the rear side for every data area, based on previously associated front and rear information, and stores them, as illustrated in the front and rear association registration portion 15c and the data storing portion 13 of a registration destination thereof.

Here, the front and rear information indicates the information that shows a front-and-rear position relation between one side and the other side of the document (document position relation). As the front and rear information, for example in the transparent sheet 4 as shown in FIG. 2, the front-and-rear position relation may be known by connecting such as "front 1-1" with "rear 1-2" which is rear side thereof, "front 1-2" with "rear 1-1" which is rear side thereof, and "front 2-1" with "rear 2-2" which is rear side thereof, for example between front-side image data 5 and rear-side image data 6 in FIG. 3. The front and rear information is stored in the front and rear association registration portion 15c, or in the data storing portion 13.

In this way, the front and rear sides of the business card are associated so that a database of the front and rear sides is formed as data for one business card, after the character recognition processing. In addition, even in a case where a user places the rear side of the transparent sheet 4 in an opposite direction on a document platen and the transparent sheet 4 is read as it is, it is found that the document is placed in the opposite direction because the character direction is found by the character recognition, which will be described later. At this time, an association for the opposite direction may be previously performed, or the processing may be performed after reversing one of the image data. In addition, an association for a normal direction and an association for an opposite direction may be prepared as front and rear information so as to be selected by a user.

In this way, the PC 1 used in the present invention performs an image analysis (character recognition etc.,) for both sides, based on the associated front and rear information, for every range area of respective contained documents from the received image data, to associate and store the image data subjected to the image analysis for each document.

Figure 6:
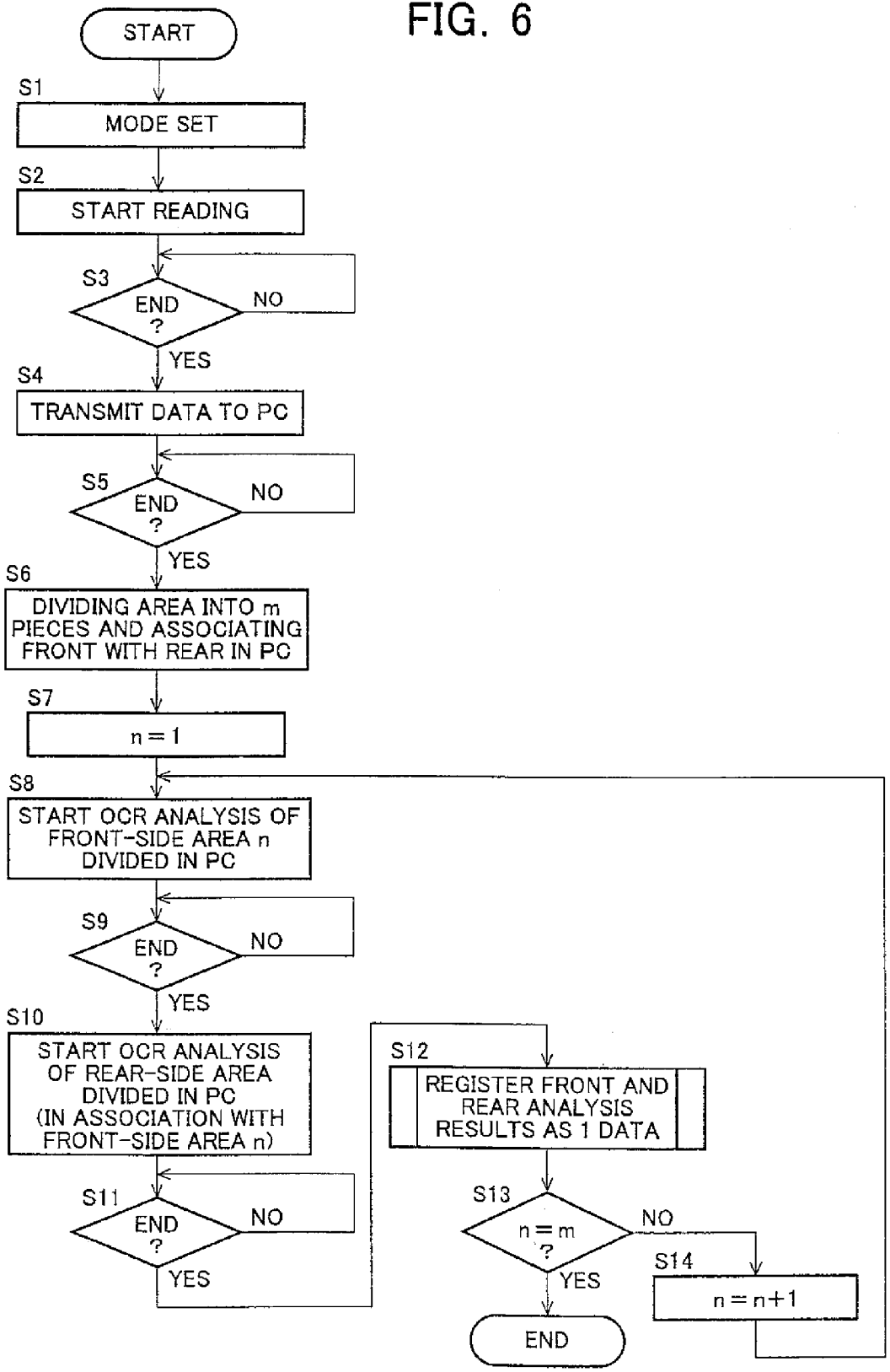
FIG. 6 is a flow diagram for explaining an example of a control in the image processing system of FIG. 1.
Figure 7:
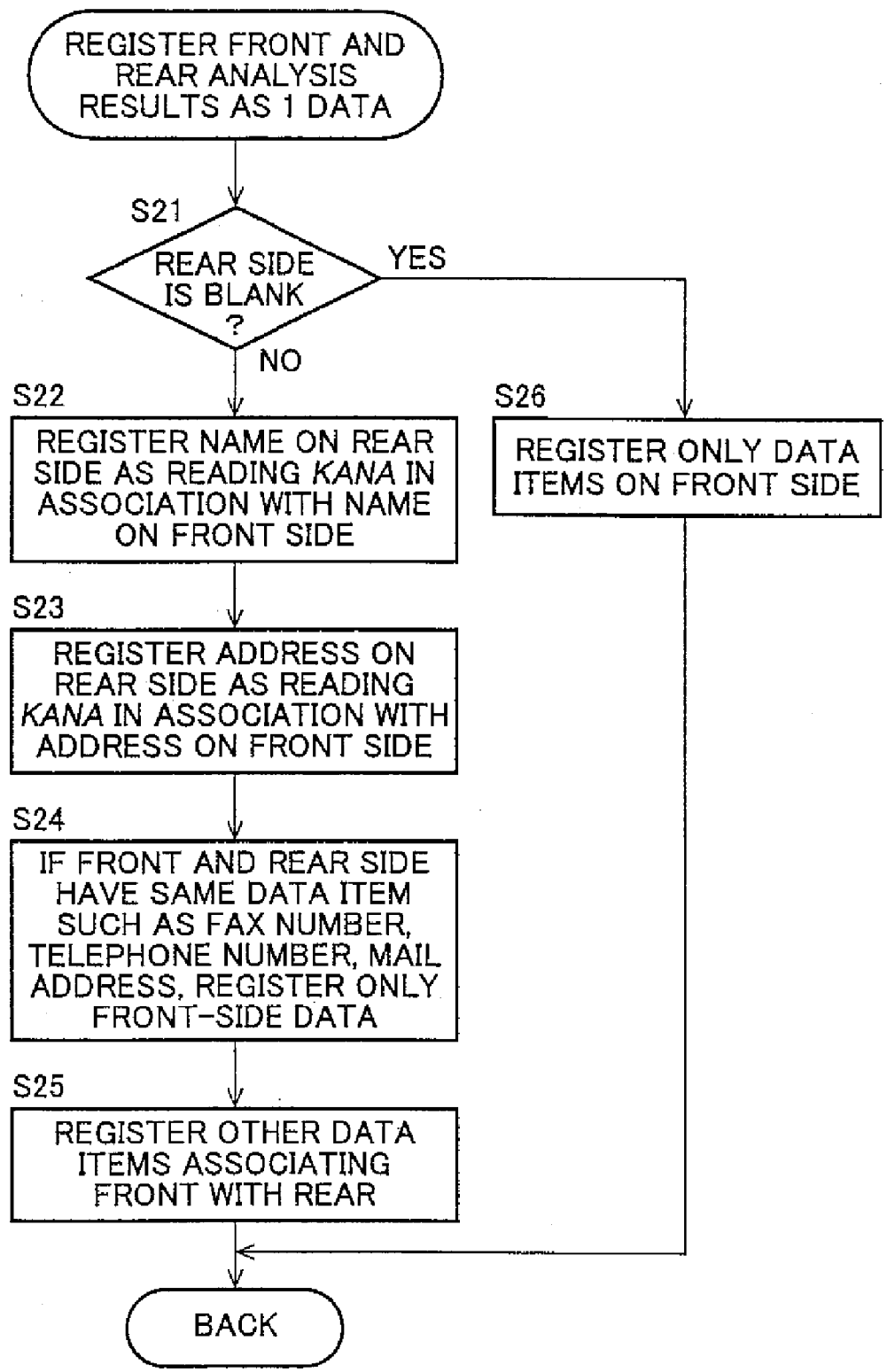
FIG. 7 is a flow diagram for explaining an example of a data registration processing in the control example of FIG. 6.

The image processing system of the present invention will be described with a specific control example, below. FIG. 4 is a diagram for showing an example of a pair of image data obtained from both sides of a transparent sheet which are actually read by the image processing system in FIG. 1, where 50 shows front-side image data of a business card group, and 60 shows rear-side image data of the business card group. FIG. 5 is a diagram for showing an example of a data table generated from the pair of image data in FIG. 4, where 7 shows the data table. FIG. 6 is a flow diagram for explaining an example of the control in the image processing system of FIG. 1, and FIG. 7 is a flow diagram for explaining an example of a data registering processing in the control example of FIG. 6.

First, the business card image transmission control portion 26a of the MFP 2 sets a mode based on an instruction given directly from the operation display portion 25 or via the PC 1, by a user (step S1). Herein, the mode to be set indicates a mode for automatically performing a character recognition and storage by associating the front with the rear side, and following processing are not performed when other modes are set. Further, in the mode setting, a user needs to select a setting as to "whether or not the document (herein, business card) is a double-sided document requiring to associate front with rear", or a setting as to a sheet format such as "business card/double-sided document/2×5 A4-sized sheet", as a part of operations in scanning. This is because, actually, when the sheet is not a transparent sheet, or when the transparent sheet 4 is used but business cards are contained only in front sides of respective pages (i.e. other business cards are contained in the rear sides), the front-and-rear association is not required.

Subsequently, when a user places the transparent sheet 4 on a document platen and performs a processing of reading a business card from the operation display portion 25, the business card image transmission control portion 26a starts to read one side by one side (step S2), followed by waiting for the completion of the processing (step S3). Here, because many automatic document feeders do not deal with sheets such as a transparent sheet 4, the placement on the document platen and the re-placement for the rear side are basically performed by a user. However, both sides may be read at a time by including an applicable automatic document feeder.

Specifically, the A-4 sized transparent sheet 4 that contains 2×5 pieces of double-sided business cards as shown in FIG. 2 is scanned for every side or for both sides, resulting that the front-side (odd-page) image data 50 and the rear-side (even-page) image data 60 are generated, for example as shown in FIG. 4. Note that, in the image data 50 and the image data 60, a part of image contents is omitted, and the description is made by applying the same letters E to J to the corresponding parts between front and rear sides based on the front and rear information described in FIG. 3.

Subsequently, the business card image transmission control portion 26a transmits the image data for the front and rear sides to the PC 1 (step S4), followed by waiting for the completion of the processing (step S5). In the step S4, with the image data, a selected value in "the mode setting" may be transmitted to the PC 1 side in XML etc. In the PC 1 side, it is determined whether or not the image has been scanned as "a double-sided document requiring to associate front with rear" based on the information, so that the processing for associating front with rear, which will be described later, is performed optionally.

In the PC 1 side, based on the image data (scanned image) received from the MFP 2 by the communication portion 14, the business card size dividing portion 15*a* performs the processing for associating front with rear, and the dividing the sheet into m pieces (m is 10 in the example of FIG. 4) of areas (area division) each having a business card size (step S6).

Herein, the processing for associating front with rear is the processing for associating the two received image data, in which, when the received image data is a set as a pair, only a confirmation that the image data is the set is performed, and when the image data is not the set but is sequentially transmitted, the consecutive two image data are associated as front and rear image data.

Subsequently, the OCR portion 15*b* sets n to 1 (step S7), and starts an OCR analysis for the divided front-side area n (step S8), followed by waiting for the completion of the processing (step S9). Then, with respect to the area n subject to the OCR analysis in the step S8, the OCR portion 15*b* detects a rear-side area thereof by referring to the front and rear information illustrated in FIG. 3, and starts the OCR analysis for the rear-side area n (step S10), followed by waiting for the completion of the processing (step S11). Based on the analysis results (character recognition results) in the steps S8 and S10, the front and rear association registration portion 15*c* registers the analysis results for the front and rear areas n in the data storing portion 13 as one piece of data as described below (step S12).

In the step S12, the analysis results can be registered in the data storing portion 13 as a database such as an address book as illustrated in the data table 7. Thereby, when the front-side area n is an image area read from the "front 1-1" in FIG. 3 (business card image 51 in FIG. 4), each information 51*a* to 51*e* included in the business card image 51 is associated with each information 61*a* to 61*e* included in a business card image 61 serving as a corresponding rear-side area n (image area read from the "rear 1-2" in FIG. 3), to be registered in the data table 7. Herein, the description will be made on the basis of the front-side area n, however, the business card image 61 has mail address information 61*f*, and the front side thereof does not have mail address information. To cope with such a case, if following processing are performed by defining the number of areas of the side having more information (herein, the business card image 61 on the rear side) as n, it is found that the area corresponding to the area 61*f* is not on the front side, resulting that only information of the area 61*f* is registered in the data table 7.

Subsequent to the step S12, the OCR portion 15*b* determines whether or not n becomes equal to m (step S13), and when n equals to m, the processing is completed, and when n does not equal to m, n is incremented (step S14), followed by going back to the step S8 to repeat the processing of the steps S8 to S13 with respect to remaining areas as well. By repeating the processing like this, it is possible to perform a registration of all business card images in the data table 7. In FIG. 4, for example, each information in the business card image 52 is associated with each information in the business card image 62, each information in the business card image 53 is associated with each information in the business card image 63, each information in the business card image 54 is associated with each information in the business card image 64, and each information in front-side business card images E to J is associated with each information in rear-side business card images E to J, which are then registered in the data table 7.

In the step S12, as illustrated in FIG. 7, the front and rear association registration portion 15*c* determines whether or not the rear side of the area n is blank (step S21), and when the rear side is blank, data items of the only front side obtained individually by the character recognition are registered in the data storing portion 13 (step S26), followed by completing the processing. For example, since the rear-side business card image 64 is blank, the processing of the step S26 is executed. On the other hand, when the rear side is not blank in the step S21, the registration in the data storing portion 13 is performed using character information of both sides of the area n (steps S22 to S25, which will be described later), followed by completing the processing. Note that, the steps S22 to S25 may be performed in any order.

In this way, the PC 1 preferably includes a blank determination section that performs, with respect to each of the received image data of the front and rear sides, an image analysis for every data area to determine whether or not the area is blank, before the character recognition. Further, the character recognition is not performed with respect to the data area that has been determined to be blank by the blank determination section. Furthermore, when the character recognition was performed for the data area in front-and-rear relation with the data area that has been determined to be blank by the blank determination section, without being determined to be blank, then the front and rear association registration portion 15*c* stores only character information of the data area in which the character recognition has been performed. In the image analysis, when one side is detected to be blank, only image data on the other side is stored, and thereby only data on the front side can be stored in a case of a business card not having any image data on a rear side, resulting that reduction in the amount of data can be achieved.

In addition, if such blank determination section is not provided, when no character exists in one of the character information among a set of the character information obtained by performing the character recognition for the both data areas in front-and-rear relation, the front and rear association registration portion 15*c* stores only the other character information. Even in such a configuration, when one side is blank, the side is recognized to be in a state of having no character, thus only data on the front side can be stored in a case of a business card not having any data on a rear side by storing only image data on the other side, resulting that reduction in the amount of data can be achieved.

In the step S22, with respect to the area n, a name on the rear side (e.g., information 61*b* in FIG. 4) is translated as its reading kana, and registered in association with a name on the front side (e.g., information 51*b* in FIG. 4). In the step S23, with respect to the area n, an address on the rear side (e.g., information 61*c* in FIG. 4) is translated as its reading kana, and registered in association with an address on the front side (e.g., information 51*c* in FIG. 4).

In this way, the OCR portion 15*b* may perform the character recognition after dividing into different groups of information associating with each of the data area have different languages used. Thereby, the front-side image data and the rear-side image data are registered in association with each other even when used languages are different. However, when the front side also has an English notation such as "FAX", it is possible to deal with as a notation sufficiently adaptive to data of Japanese dictionaries.

Further, like the steps S22 and S23, with respect to the set of the character information that is recognized for the data areas in front-and-rear relation, when each character information includes an identical content (information of items, such as name information 51b and name information 61b), the front and rear association registration portion 15c stores information having an identical content in association with each other. Thereby, for example, an English version and a Japanese version for a name, an address, or a company name are registered in association with each other.

Furthermore, like the steps S22 and S23, the association of each information having an identical content is preferably performed after translating information on one side into a language of information on the other side. Thereby, for example, reading kana that is a translation of a name, an address, or a company name in English version, and its Japanese version are registered in association with each other. Of course, the registration in the data table 7 may be performed with the original English version of the translation left.

In the step S24, when the front side and the rear side have an identical data item such as a fax number, a telephone number, or a mail address, only data on the front side (or the rear side) is registered. In this way, with respect to the set of the character information that is recognized for the data areas in front-and-rear relation, when each character information has information in a same notation, the front and rear association registration portion 15c preferably does not store one of the character information. In a case where the front and rear sides have a same notation such as a mail address or a fax number of the items showing a same content, it is possible to avoid a duplicate registration of same data, and an increase of data amount can be prevented. In addition, when a country number is included in a telephone number or a fax number, the country number may be omitted when registering.

In the step S25, other data items being not subject to the steps S22 to S24 are registered with the front and rear sides associated each other. In this way, in the control portion 15 of the PC 1, the business card size dividing portion 15a divides a scanned image into business card sizes, and thereby business card image data of the front side and business card image data of the rear side are generated for each piece, and each character information included in the sides of business card is recognized by the OCR portion 15b, then this recognition result is registered with the front and rear sides associated each other by the front and rear association registration portion 15c.

By the registration as described above, as illustrated in FIG. 5, the data table 7 including an ID 70 that is automatically provided, as well as a name 71, a name (reading kana) 72, a company 73, a company (reading kana) 74, an address 75, an address (reading kana) 76, a telephone number 77, a fax number 78, and a mail address 79, is stored in the data storing portion 13. Note that, reading kana information corresponding to information is easily viewed by storing them side by side such as storing the name 71 next to the name (reading kana) 72. Note that, in FIG. 5, data such as the name 71, the company 73 and the address 75, are represented formally in Japanese and kanji is also used.

Further, like the business card image 52, as the result of the image analysis, when image data 52P such as a face photo that has been recognized as an image not as a character exists, the image data 52P is processed as an attached image, and this image is stored as data and its storage destination is stored in the data table 7. Furthermore, the data storing portion 13 may be configured so as to store a pair of received image data itself, where information showing its storage destination may be stored in the data table 7.

In addition, the description has been made only on the processing for one sheet in FIGS. 6 and 7, however, the processing for continuously scanning a plurality of sheets is also considered indeed. In such a case, when scanned images of only front sides of a plurality of sheets are transmitted and then scanned images of only rear sides of a plurality of sheets are transmitted, an association may be performed in response to the number of sheets such as an association between the first of the front side and the first of the rear side, and an association between the second of the front side and the second of the rear side. Alternatively, an association can be performed so that scans of the front and rear sides are repeated and each two becomes one set. In addition, the scan itself may be performed by using an automatic document feeder, or by manually placing a sheet on a document platen without using the automatic document feeder.

Further, in FIG. 6, the description has been made such that the steps S1 to S5 are the processing performed in the MFP 2 side, and the steps S6 to S14 are the processing performed in the PC 1 side, however, the processing for associating front with rear for every business card may be previously performed in the MFP 2 side by causing a user to select up to a sheet format such as "business card/double-sided document/ 2×5 A4-sized sheet", in the "mode setting" by the operation display portion 25 of the MFP 2. Herein, the processing for associating front with rear for every business card covers up to the processing for dividing a sheet into every business card area and composing the front and rear images into one image data (there is no need to perform the composition, but just to associate them with each other as a pair of image data). In either case, it is only necessary that character information can be obtained for every data area corresponding to containing ranges of the respective documents on a transparent sheet by the character recognition with respect to each of the received image data on the front and rear sides in the above-mentioned character recognizing section, and that the recognized character information can be stored associating the front side with the rear side for each of data area, based on the front and rear information, in the above-mentioned document information storing section.

As described above, even when the front side and the rear side of the transparent sheet in which a plurality of business cards are contained are read one side by one side (or both sides at a time) by a general scanner, the front and rear associating processing is performed "automatically and properly", and therefore data of the front and rear sides is treated as data for one business card, resulting that it is possible to form a database with the data of the front and rear sides being one data. That is to say, in a system, where business cards are contained in a business card file consisting of a plurality of transparent sheets in which a plurality of business cards can be contained in one sheet, the plurality of business cards are read at a time, and an OCR processing and database formation can be performed automatically, it is possible to perform a double side scan of the transparent sheet in which especially business cards printed on both sides are contained to associate the front side with the rear side. Accordingly, in the present invention, an operation that has been required in conventional techniques, in other words, a manual operation of recollecting each data showing the front and rear information respectively as one data with respect to all business cards becomes unnecessary.

As described above, while each embodiment of the image processing apparatus according to the present invention has been described with reference to FIGS. 1 to 7, the present invention employs an embodiment as an image processing method using a computer such as the PC 1, and an image processing apparatus such as the MFP 2, as explanation of the control flow.

Further, the present invention employs a configuration as a program incorporated into an image processing apparatus, or a program incorporated into a computer. These are the programs illustrated as the control program in the control portion 26 and illustrated in the control portion 15.

For example, a program for the MFP 2 is a program to be incorporated into the MFP 2 provided with the scanner portion 23, the communicating portion 21 capable of communicating with the PC 1, and the control portion 26, in which, when an operation for performing a reading of a transparent sheet like in the present invention is received from a user, both sides of the transparent sheet are read by the scanner 23, and the PC 1 is caused to perform a processing of transmitting image data of the front and rear sides to the PC 1.

Further, a program for the PC 1 is to be incorporated into the PC 1 having the communicating portion 14 capable of communicating with the MFP 2, and the control portion 15. This program causes the control portion 15 (a CPU in the control portion 15) to perform a receiving step in which image data of front and rear sides that is obtained by optically reading the front and rear sides of a transparent sheet capable of containing a plurality of documents of the given size in the MFP 2 is received from the MFP 2; a character recognizing step in which character information is obtained for every data area corresponding to containing ranges of the respective documents on the transparent sheet by the character recognition, with respect to each of the received image data of the front and rear sides; and a document information storing step in which, based on front and rear information that is previously associated, the character information recognized in the character recognizing step is stored associating the front side with the rear side for every data area.

As a result, such a program can be distributed as a computer-readable storage medium in which the program is stored, or via a network, and the program therefore can be incorporated executably into the image processing apparatus or the computer.

In accordance with the present invention, in a transparent sheet in which a plurality of documents whose information on front and rear sides is printed as a pair are contained, the information on the front and rear sides of the same document is stored in association with each other, without taking the labor.

The invention claimed is:

1. An image processing system including a computer, and an image Processing apparatus connected to the computer, wherein
the image processing apparatus has a reading section that optically reads a transparent sheet containing a plurality of documents of given size, to convert into image data; and a transmitting section that transmits the image data of front and rear sides consisting of one-side image data that has been obtained by optically reading a whole of one side by the reading section, and the other-side image data that has been obtained by optically reading a whole of the other side by the reading section, to the computer, and the computer has a receiving section that receives the image data of the front and rear sides transmitted from the image processing apparatus; a character recognizing section that obtains character information for each of data area corresponding to containing ranges of the respective documents on the transparent sheet by character recognition, with respect to each of the image data of the front and rear sides received by the receiving section; and a document information storing section that relates the character information of the front side recognized by the character recognizing section to that of the rear side for each of the data area, based on previously associated front and rear information showing a front-and-rear position relation between one side and the other side of the document, and stores them.

2. The image processing system as defined in claim 1, wherein the character recognizing section performs the character recognition after dividing into each of the data area, with respect to the respective image data of the front and rear sides received by the receiving section, or divides into each of the data area after performing the character recognition, with respect to the respective image data of the front and rear sides received by the receiving section.

3. The image processing system as defined in claim 1, wherein the character recognizing section performs the character recognition after dividing into different groups of information associating with each of the data area have different languages used.

4. The image processing system as defines in claim 3, wherein, when each character information has an identical content in a set of the character information recognized for data areas in front-and-rear relation by the character recognizing section, the document information storing section relates the information having the identical content each other, and stores them.

5. The image processing system as defined in claim 4, wherein the relating the information having the identical content is performed by translating information of one side into a language of information of the other side.

6. The image processing system as defined in claim 1, wherein when each information includes information having an identical notation in a set of the character information recognized for the data areas in front-and-rear relation by the character recognizing section, the document information storing section does not store one of the character information.

7. The image processing system as defined in claim 1, wherein when one of the character information has no character of a set of the character information recognized for the data areas in front-and-rear relation by the character recognizing section, the document information storing section stores only the other character information.

8. The image processing system as defined in claim 1, wherein the computer has a blank determination section, in which, with respect to the image data of the front and rear sides received by the receiving section, an image analysis is performed before the character recognition by the character recognizing section to determine whether or not the image data is blank for each of the data area, and the character recognizing section does not perform the character recognition for the data area that has been determined to be blank by the blank determination section.

9. The image processing system as defined in claim 8, wherein when the character recognition is performed for the data area in front-and-rear relation with the data area that has been determined to be blank by the blank determination section, without being determined to be blank, the document information storing section stores only character information in which the character recognition is performed.

10. An image processing method using a computer and an image processing apparatus connected to the computer, including:
a reading step consisting of a step for optically reading a whole of one side to convert into one-side image data, and a step for optically reading a whole of the other side to convert into the other-side image data, with respect to a transparent sheet capable of containing a plurality of documents of given size by a reading section of the image processing apparatus;

a transmitting step in which a transmitting section of the image processing apparatus transmits the image data of front and rear sides obtained in the reading step to the computer;

a receiving step in which a receiving section of the computer receives the image data of the front and rear sides transmitted from the image processing apparatus in the transmitting step;

a recognizing step in which a character recognizing section of the computer obtains character information for each of data area corresponding to containing ranges of the respective documents on the transparent sheet by character recognition, with respect to each of the image data of the front and rear sides received in the receiving step; and a storing step in which a document information storing section of the computer relates the character information of the front side recognized in the recognizing step to that of the rear side for each of the data area, based on previously associated front and rear information showing a position relation between one side and the other side of the document, and stores them.

11. A program stored in a non-transitory computer readable medium that is connectable to an image processing apparatus, wherein the program causes the apparatus to execute a receiving step in which image data of front and rear sides that is obtained by optically reading front and rear sides of a transparent sheet containing a plurality of documents of given size in the image processing apparatus is received from the image processing apparatus; a character recognizing step in which, with respect to each of the received image data, character information for each of data area corresponding to containing ranges of the respective documents on the transparent sheet by character recognition is obtained; and a document information storing step in which the character information of the front side recognized in the recognizing step is related to that of the rear side for each of the data area, based on previously associated information of the front and rear sides showing a position relation between one side and the other side of the document, and stored.

12. The image processing system as defined in claim 2, wherein the character recognizing section performs the character recognition after dividing into different groups of information associating with each of the data area have different languages used.

* * * * *